United States Patent [19]

Chan et al.

[11] Patent Number: 4,722,964
[45] Date of Patent: Feb. 2, 1988

[54] EPOXIDIZED POLYALKYLENEAMINE-AMIDE WET STRENGTH RESIN

[75] Inventors: Lock-lim Chan, Willowdale; Patrick W. Lau, Scarborough, both of Canada

[73] Assignee: Borden, Inc., Columbus, Ohio

[21] Appl. No.: 876,796

[22] Filed: Jun. 20, 1986

[51] Int. Cl.$^4$ .............................................. C08G 69/48
[52] U.S. Cl. .................................. 524/608; 162/164.3; 162/164.6; 525/430; 525/435; 528/342
[58] Field of Search ................ 525/430, 435; 524/608; 528/342; 162/164.3, 164.6

[56] References Cited

U.S. PATENT DOCUMENTS

| 2,926,116 | 2/1960 | Keim | 162/164 |
|---|---|---|---|
| 3,125,552 | 3/1964 | Loshaek et al. | 260/78 |
| 3,224,990 | 12/1965 | Babcock | 260/29.2 |
| 3,311,594 | 3/1967 | Earle | 260/77.5 |
| 3,640,840 | 2/1972 | Zieman et al. | 162/164 |
| 3,793,279 | 2/1974 | Lipowski | 260/29.2 |
| 3,887,510 | 6/1975 | Chan et al. | 260/29.2 |
| 3,947,383 | 3/1976 | Baggett | 260/2 |
| 3,966,684 | 6/1976 | Espy et al. | 260/77.5 |
| 4,388,439 | 1/1983 | Maslanka | 524/845 |
| 4,450,045 | 5/1984 | Hertel et al. | 525/430 |

FOREIGN PATENT DOCUMENTS 0126176 11/1984 European Pat. Off. .
0127129 12/1984 European Pat. Off. .

Primary Examiner—Harold D. Anderson
Attorney, Agent, or Firm—Robbins & Laramie

[57] ABSTRACT

This invention describes an improved cationic wet strength resin prepared from: an epichlorohydrin-ammonia intermediate reaction product; polyalkyleneamine-amide, and epichlorohydrin. This resin is not only efficient in imparting wet strength to paper but also provides that the treated paper is easier to repulp than paper treated with conventional epoxidized polyalkyleneamine-amide.

52 Claims, No Drawings

EPOXIDIZED POLYALKYLENEAMINE-AMIDE WET STRENGTH RESIN

FIELD OF THE INVENTION

This invention describes an improved cationic wet strength resin which is not only efficient at imparting wet strength to paper but also provides that paper treated with this resin is easier to repulp than paper treated with conventional resins when paper of equal wet strength are compared.

BACKGROUND OF THE INVENTION

This invention relates to an improved epoxidized polyalkyleneamine-amide resin. The resin of this invention is not only efficient in imparting wet strength to paper, but also paper treated with the resin of this invention can be repulped under substantially less demanding conditions than paper treated with conventional, commercially available epoxidized polyalkyleneamine-amide resin, when papers with the same degree of wet strength are compared.

Paper is sheet material comprising bonded small, discrete fibers. The fibers are usually formed into a sheet on a fine screen from a dilute water suspension or slurry. Paper is usually made from cellulose fibers although occasionally, synthetic fibers are used. Paper made from untreated cellulose fibers retains very little of its original strength after it has been soaked in water, i.e., it has very little wet strength. The wet strength of paper is defined as the resistance of the paper to rupture or disintegration when it is wetted with water. In order to increase the wet strength of paper, wet strength resins have been developed for use in the paper industry. These polymeric substances have been used to impart wet strength to different types of paper, for example, paper towels, facial tissue, bag paper and map paper. In some cases the wet strength resins are added to the slurry; in other cases the resin is applied to partially or completely dried paper.

Wet strength resins currently used in the paper making industry include urea-formaldehyde resins, melamine-formaldehyde resins, polymeric amines and epoxidized resins such as polyalkyleneamine-amide resin epoxidized with epichlorohydrin.

Prior art epoxidized polyalkyleneamine-amide resins have met with commercial acceptance by the papermaking industry because they can be used at neutral pH to impart wet strength whereas other resins, such as urea-formaldehyde resins, are used at other than neutral pH. The use of these epoxidized resins instead of urea-formaldehyde resins not only results in less corrosion of the papermaking machinery but also produces a paper product with improved softness. Commercially acceptable epoxidized polyalkyleneamine-amide resins are described in Keim, U.S. Pat. No. 2,926,116, and Chan et al., U.S. Pat. No. 3,887,510. The main disadvantage of this type of resin is the difficulty in the "repulping" of the broke, i.e., breaking down of waste paper to separate the fibers and disperse them in water. This disadvantage has become more significant as the re-use of waste paper has increased during the last few years.

Waste paper must be repulped in order to use it for papermaking. The ease of repulping paper depends on the degree of wet strength imparted to the paper, the type of chemicals used to achieve the wet strength properties, the type of fiber that is used to make the sheets, the degree of mechanical defibering permissible, and the type of repulping equipment available. In practical operation paper mill operators will want to repulp in as short a time as possible with as little investment in mechanical devices as possible and with minimum damage to fibers. A resin which gives good wet strength to paper but which also gives a paper that can be repulped easily is most desirable.

Paper treated with different types of resins are usually repulped under different conditions. Urea-formaldehyde resin-treated paper is easily repulped by adjusting the pH to about 3. However when this resin is used to make paper, the resin must be used under acidic conditions usually with a pH of about 4. The acidic conditions cause corrosion of expensive papermaking machinery.

Paper treated with polyacrylamide-glyoxal type resin is easily repulped since this resin only gives temporary wet strength to paper. Paper treated with this resin maintains its strength upon instant contact with water but loses the wet strength upon further wetting. This type of paper therefore, it not useful for paper bags or for certain types of wipers.

Epoxidized polyalkyleneamine-amide type resin gives a relatively more permanent wet strength to paper, and is suitable for most grades of paper. This property however makes the paper more difficult to repulp. An extensive laboratory study comparing the repulping characteristics of paper treated with urea-formaldehyde and the repulping characteristics of paper treated with epoxidized polyalkyleneamine-amide type resins was reported in an article published by C. Schmalz (*TAPPI Journal* 44, 275–280, April, 1961). In this laboratory study, handsheets made with different types of brokes such as polyamide-type wet strength brokes, melamine-formaldehyde wet strength brokes, and urea-formaldehyde wet strength brokes were defibered in a TAPPI disintegrator according to the TAPPI standard method T205 M-58. The handsheets were defibered at various levels of pH, with or without addition of hypochlorites and at varous temperatures. Samples were removed at different intervals of time. The samples were used to make handsheets and these handsheets were then compared with standards to ascertain the degree of fiber separation.

The study concluded that in order to defiber paper treated with epoxidized polyalkyleneamine-amide resin in a reasonable period of time, the addition of sodium hydroxide to maintain a pH of at least 10 or higher, a temperature of more than 50° C., and the addition of sodium or calcium hypochlorite was required. It was also concluded that unbleached paper is generally more resistant to defiberation. Unbleached paper requires the use of excessive amounts of hypochlorite because the extra hypochlorite is used up in bleaching the unbleached fiber. The need to use excessive amounts of hypochlorite is not desirable. Hypochlorite changes the optical properties of unbleached paper. An excessive amount of hypochlorite ion in the slurry adversely affects the wet strength efficiency of the resin in paper made from the repulp.

SUMMARY OF THE INVENTION

Therefore it is highly desirable to provide a wet strength resin that has the wet strength property comparable to conventional commercial available epoxidized polyamide resin, but has the advantage that the wet strength treated paper can be repulped under less demanding conditions. The wet strength efficiency and repulping characteristics of wet strength paper can be determined in the laboratory according to established methods.

The resin of this invention not only provides suitable wet strength to paper but also provides that the treated paper can be repulped under less demanding conditions. The resin of this invention is made from polyalkyleneamine-amide, ammonia, and epichlorohydrin and requires that as a first step the ammonia be reacted with part of the epichlorohydrin to form an intermediate that is then reacted with the polyalkyleneamine-amide and the rest of the epichlorohydrin.

The material of the Babcock U.S. Pat. No. 3,224,990, assigned to Pacific Resins and Chemical, Inc., is made from reactants similar to the reactants of this invention. The Babcock wet strength resin is made from polyalkylene polyamine-amide, ammonia and epichlorohydrin in a one-step reaction. The Babcock resin is different from the resin of this invention. Babcock does not as a first step react the ammonia with part of the epichlorohydrin. The resin of this invention has superior wet strength properties and repulping properties. The superior properties of resin of this invention are attributable to the way in which the resin is made and in particular the requirement that the ammonia be reacted with part of the epichlorohydrin before the addition of the polyalkyleneamine-amide and the remainder of the epichlorohydrin.

This invention is a cationic, water soluble, thermosetting epoxidized polyalkyleneamine-amide resin which can be used to impart wet strength to paper products, and a method for making the resin. This resin has wet strength performance as efficient as conventional, commercially available epoxidized polyalkyleneamine-amide wet strength resins. Furthermore, paper treated with this resin is substantially easier to repulp than that treated with conventional epoxidized polyalkyleneamine-amide resins, when comparing papers with the same degree of wet strength.

The chemistry involved in the preparation of this resin can be described in two stages as follows.

In the first stage, a polyalkyleneamine-amide polymer is made by the condensation polymerization of a polyalkylene polyamine and a diester of a saturated aliphatic dibasic carboxylic acid. The polyalkyleneamine-amide polymer has a chemical structure that may be represented as follows:

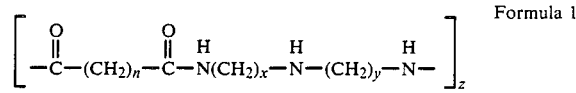

Formula 1 where n, x, y, z are the number of repeating structural units ranging from 2, 3, 4 ... etc. In general, however, the polyalkyleneamine-amide can be prepared by any means that is known in the prior art as long as it contains a structural unit which has at least one secondary amine between two amide groups.

The second stage involves two steps. In the first step, epichlorohydrin and ammonia are reacted to give an intermediate which may have the general structure shown as follows:

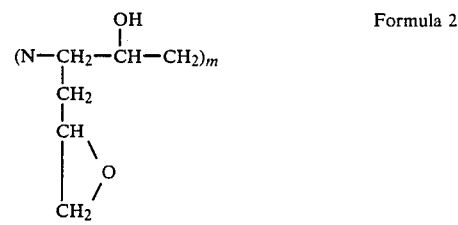

Formula 2

In the second step, the intermediate (Formula 2) is reacted with the polyalkyleneamine-amide of the first stage and an additional amount of epichlorohydrin to produce a product that may have the general structure as follows:

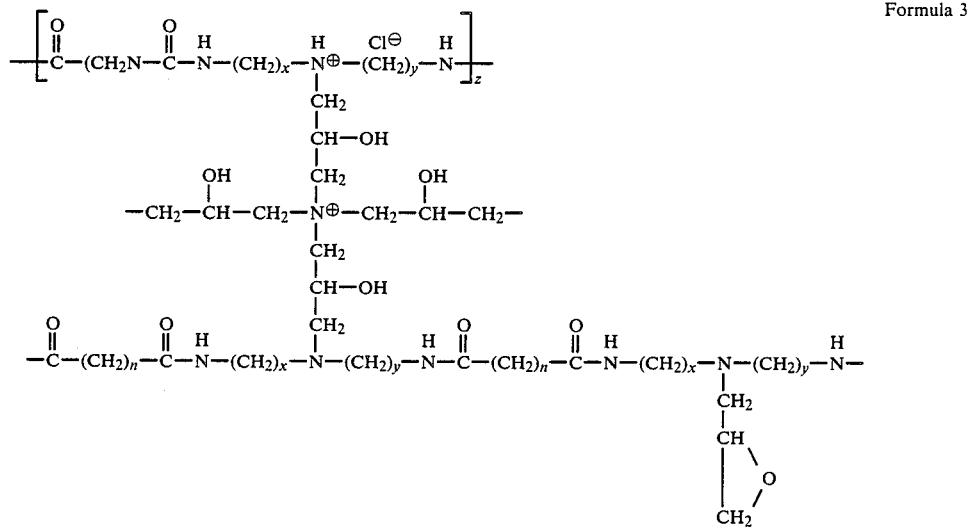

Formula 3

This improved wet strength resin can be used in the papermaking industry according to conventional methods.

DETAILED DESCRIPTION

The wet strength resin of the invention is prepared from polyalkyleneamine-amide, an epichlorohydrin-ammonia intermediate, and epichlorohydrin.

One preferred polyalkyleneamine-amide is made by the condensation polymerization of dimethylglutarate, which is a diester of a saturated aliphatic dibasic carboxylic acid, and diethylenetriamine, which is a polyalkylene polyamine. The preferred molar ratio of diester to polyalkylene polyamine is from 0.9:1 to about 1.2:1. Details of this polymerization are described in Chan, U.S. Pat. No. 3,887,510, assigned to Borden, Inc. The wet strength resin of this invention is made by reacting epichlorohydrin, ammonia, and the polyalkyleneamine-amide in preselected proportions, and according to a specific order of addition of the reactants.

First, epichlorohydrin is allowed to react with ammonia, preferably at a molar ratio of epichlorohydrin to ammonia of 2:1, in an aqueous solution. For this reaction, the concentration of the total reactants may be 30%, so that the reaction proceeds at a desirable rate.

When this first polymerization reaction has taken place, an additional amount of epichlorohydrin and the polyalkyleneamine-amide are added, and a second polymerization reactin begins. The molar ratio of total epichlorohydrin: ammonia:polyalkyleneamine-amide is preferably 3.5:1:1. At the beginning of this second polymerization, it is necessary to use a very small amount of sodium hydroxide (equivalent to about 0.4% of the total resin weight, both dry basis) to raise the pH from 6.8 to above 7. The adjustment of pH is needed at this early stage. The rate of polymerization is manipulated by the control of reaction temperature and concentration of reactants. Acids such as sulfuric acid or hydrochloric acid are used to adjust the pH of the final product to about 3.5 to stablize the resin at about 16% solids content.

Typical physical properties of this resin using the preferred polyalkyleneamine-amide are:

| Brookfield Viscosity (LVF 2/60 rpm/25° C.)* | 90–100 cps |
|---|---|
| Solids Content | 16.0 ± 0.5% |
| pH at 25° C. | 3.5 ± 0.1 |
| S.G. at 25° C. | 1.061–1.064 |
| Gardner Color | 1–3 |

*The abbreviation LVF 2/60 rpm/25° C. indicates that the viscosity determination was made on a Brookfield LVF viscometer using a #2 spindle at 60 rpm and at 25° C. Similar abbreviations appear elsewhere.

The resin can be added in the same manner as conventional epoxidized polyalkyleneamine-amide resins. Preferably this resin is added to the pulp slurry in the papermaking process where there is sufficient mixing. The amount of resin added is preferably from 0.1% to 2% by weight based on resin solids dry basis and on the weight of the dry pulp, the amount added depending on the degree of wet strength desired in the finished paper product. The preferred pH of the system during papermaking is from about 6 to about 8.

Other modifications and alternatives are permissible in making the resin of this invention as will be described. The preferred dicarboxylic diesters contemplated for use in making the polyalkyleneamine-amides of this invention include the diesters derived from $C_3$ to $C_6$ saturated and unsaturated aliphatic dicarboxylic acids and $C_1$ to $C_3$ saturated aliphatic monohydric alcohols. Suitable acids from which the esters are derived include malonic, succinic, glutaric and adipic acids, used singly or in admixture. Suitable preferred alcohols from which these esters are derived include, singly or in combination, methanol, ethanol, propanol and isopropanol. The esters of methanol and ethanol are preferred, in particular the methyl esters. While corresponding esters derived from higher alcohols also undergo the reaction of this invention, their higher cost and their more difficult removability by "stripping" (on account of their higher boiling points) makes them less desirable.

Preferred dicarboxylic diesters include dimethyl malonate, diethyl malonate, dimethyl succinate, di-isopropyl succinate, dimethyl glutarate, di-iosbutyl glutarate, dimethyl adipate, di-n-propyl adipate, methyl ethyl adipate or a mixture of dimethyl adipate and diethyl glutarate. The preferred diester is dimethyl glutarate.

While the diester component is preferably formed from a $C_3$ to $C_6$ dicarboxylic acid, both saturated and unsaturated aliphatic acids may be used, and, as well, acids having fewer than three carbons and more than 6 carbons, such as, for example, oxalic, pimelic, suberic, azelaic, sebacic, and, as well, unsaturated acids such as maleic and fumaric.

The polyalkylene polyamines contemplated for use in making the polyalkyleneamine-amides include those having two primary amine groups and at least one secondary amine group. Suitable polyalkylene polyamines include diethylenetriamine, triethylenetetramine, tetraethylenepentamine, dipropylenetriamine, and dihexylenetriamine. The preferred poylamine is diethylenetriamine.

In making the polyalkyleneamine-amide, the polyalkylene polyamine is reacted, in the absence of water, preferably at about 80° C. to 150° C., with the diester. The alcohol formed during the formation of the polyamide of the polyalkylene polyamine is recovered. The direct reaction between the diester and polyalkylene polyamine can be visualized as either an acylation of the polyamine or as an amidation of the ester wherein the alkoxy group of the ester is replaced by an amide group. In order to obtain a polyamide product in optimum yield with optimum color properties, the temperature employed for carrying out this acylation or amidation is preferred to be from about 80° C. to no higher than about 105° C., temperatures in the range of about 80° C. to 95° C. being particularly suitable. However, a temperature up to about 120° C. or 140° C. is effective for obtaining products with certain superior combinations of properties, and some benefits can be obtained when the reaction temperature is as high as about 170° C.

In carrying out the reaction, it is preferred to use an amount of diester sufficient to react substantially completely with the primary amine groups of the polyalkylene polyamine but insufficient to react with the secondary amine groups to any substantial extent. This will usually require a mole ratio of polyalkylene polyamine to diester from about 0.9/1 to about 1.2/1. However, mole ratios of from about 0.8/1 to about 1.4/1 can be used with satisfactory results. Mole ratios outside of these ranges are generally unsatisfactory. Thus, mole ratios below about 0.8/1 result in a gelled product or one having a pronounced tendency to gel while mole ratios above 1.4/1 result in low molecular weight polyamides.

For best yields it is preferred to carry out the acylation reaction of this invention at atmospheric pressure. However, particularly during the "stripping" stage of removing and recovering the alcohol formed, reduced pressure can be used, making possible the efficacy of lower temperatures.

The time of reaction depends on the temperatures and pressures used but will ordinarily vary from about 1.5 to about 3 hours. The time of reaction is selected so that, at the particular temperature, pressure and ratio of reactants used, a suitable molecular weight of polyamide is obtained. The molecular weight should be sufficiently high to yield an effective wet strength resin after reaction with the epihalohydrin and epoxidized ammonia, but not high enough to reduce the water solubility of the polyamide during this reaction. Molecular weight is conveniently characterized by intrinsic viscosity as measured in a 1-normal ammonium chloride solution at 25° C. using a well-known procedure such as that desribed in Flory "Principles of Polymer Chemistry" (1953) page 309. To be suitable for the contemplated use, a polyamide can have a thus measured intrinsic viscosity equal to from about 0.03 to 0.25 dl/gram. A polyamide having an intrinsic viscosity of from about 0.08 to 0.12 dl/gram is preferred.

It is permissible to use, in this invention, dry water soluble polyalkyleneamine-amide which contains the recurring structure as follows:

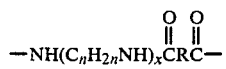

Formula 4 where n and x are integers equal to 2 or more, and R is a divalent hydrocarbon radical of a dicarboxylic acid. R can be a saturated or unsaturated hydrocarbon.

An example of these water soluble polyalkyleneamineamides is the reaction product of a saturated dicarboxylic acid, viz. adipic acid; and polyalkyleneamine, viz. diethylenetriamine, such as is described in Keim, U.S. Pat. No. 2,926,154. Another polyalkyleneamine-amide can be prepared by reacting an unsaturated dicarboxylic acid, e.g., itaconic acid, with diethylenetriamine, as described in U.S. Pat. No. 3,125,552. In general, the polyalkyleneamine-amide can be prepared by any means that is known in the prior art, as long as it contains a structural unit which has at least one secondary amine group between two amide groups.

It is permissible in this invention to use other epihalohydrins such as epibromohydrin in place of epichlorohydrin, but epichlorohydrin is preferred.

To make a preferred resin of this invention, some of the epichlorohydrin is reacted with the ammonia in an aqueous solution. The molar ratio of epichlorohydrin:ammonia in the formation of the epoxidized ammonia can be in the range from 1 to 2.5:1, the preferred molar ratio being 2:1. The amount of water is adjusted so that the concentration of the total reactants allows the initial exotherm to be controlled easily to below 60° C. with a cooling water bath. Normally a solids content of 20% to 30% is acceptable although 30% is the preferred solids content. These percentages are based on the total weight of the aqueous resin. The reaction temperature ranges from 45° C. to 60° C. and reaction time varies from 30 minutes to 24 hours.

In the preparation of wet strength resin, the amount of the polyalkyleneamine-amide and the amount of additional epichlorohydrin added to the epoxidized ammonia can range from a molar ratio of 1:1 to 1:1.7 although the preferred molar ratio of polyalkyleneamine-amide : epichlorohydrin is 1:1.5. Therefore the permissible molar ratio of total amount of epichlorohydrin : ammonia:polyalkyleneamine-amide is: 2 to 3.7 moles of epichlorohydrin, to 0.8 to 1 mole of ammonia to 1 mole of polyalkyleneamine-amide, while the preferred molar ratio is at 3.5:1:1. The reaction temperature and concentration of reactants can be determined empirically by those skilled in the art. Therefore the reaction rate can be properly controlled. While our experience indicates that the reaction can be run at a temperature of 35° C. to 60° C., the temperature at a given time will depend on the degree of condensation and concentration of reactants at that time.

The degree of polymerization affects the wet strength properties of the final product. For example, resin with a viscosity of 40–80 cps at 12% solids in water as measured with a Brookfield LVF viscometer using a #2 spindle at 60 rpm and at 25° C. has satisfactory wet strength properties.

The wet strength resin described in this invention can be applied to paper by tub application if desired. The resin can also be applied to partially or completely dried paper by immersion in or spraying with an aqueous solution of this wet strength resin, followed by drying and curing at high temperature, e.g., 105° C., for a suitable period of time, e.g., up to 1 hour.

The preferred method of incorporating these resins in paper, however, is by addition prior to sheet formation whereby advantage is taken of the substantivity of the resins for hydrated cellulosic fibers. In practicing this method, an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner, thereby curing the resin to its polymerized and water insoluble condition and imparting wet strength to the paper.

The resins of this invention impart wet strength to paper when present therein in amounts of about 0.1–5% or more based on the dry weight of the paper. The quantity of resin to be added to the aqueous stock suspension will depend on the degree of wet strength desired in the finished paper product and on the amount of resin retained by the paper fibers.

The uncured cationic thermosetting resins of this invention, when incorporated in paper in any suitable manner, as described above, may be cured under acid, neutral or alkaline conditions, i.e., at pH's from about 4.0 to 10, by subjecting the paper to a heat-treatment for about 0.5 to 30 minutes at a temperature from about 90° C. to 105° C. (i.e., in the laboratory). Optimum results, however, are obtained near neutral conditions. In view of this, and the rather extensive corrosion of equipment encountered at pH's below about 6.0, it is preferred to carry out the curing step at a pH from about 6.0 to about 8.0.

EXAMPLES

The following Examples are grouped to demonstrate the preparation of the preferred polyalkyleneamine-amide; the preparation of the wet strength resin of this invention, from ammonia; epichlorohydrin, and the preferred polyalkyleneamine-amide; the comparable wet strength and superior repulpability of paper treated with the resin of this invention when tested against papers treated with two commercially acceptable epoxidized polyalkyleneamine-amide resins; and the superior wet strength and superior repulpability of paper treated with the resin of this invention when compared with the resin of Babcock, U.S. Pat. No. 3,224,990, which is assigned to Pacific Resins and Chemicals, Inc., and hereinafter referred to as the Babcock resin. The Babcock resin comprises the same ingredients as the resin of this invention, i.e., epichlorohydrin, ammonia and polyalkyleneamine-amide. However, the Babcock resin is made in a one-step reaction.

In all the Examples and throughout this specification, all parts and percentages are by weight, and all temperatures are in degrees Celsius, unless otherwise specified.

Examples 1 to 5 describe how to prepare the resin of this invention according to the preferred method and show that the resin of this invention is comparable in wet strength performance and is easier to repulp, when evaluated against conventional commercial available epoxidized polyalkyleneamine-amide wet strength resins.

EXAMPLE 1

Preparation of the Polyalkyleneamine-amide

This Example describes the preparation of the polyalkyleneamine-amide from dimethyl glutarate and diethylenetriamine according to the procedure described in Chan, U.S. Pat. No. 3,887,510.

41.2 parts of dimethylglutarate and 26.5 parts of diethylenetriamine were put into a reactor and mixed. The mixture was heated from 80° C. to 105° C. for 2 to 3 hours. Methanol distilled off. The distillation was continued until the point when if 33.3 parts of water had been added to the reactor mix, the product would have had a solids content of 60% to 62% and a viscosity of 800 to 2200 cps., Brookfield LVF4/60 rpm/25° C.

EXAMPLE 2

Preparation of the Thermosetting Wet Strength Resin of this Invention

This Example describes the preparation of a 16% solids wet strength resin using the preferred molar ratio of 3.5:1:1 of total epichlorohydrin:ammonia:polyalkyleneamine-amide under the preferred reaction conditions.

A mixture of 253 gm water and 36 gm aqua ammonia solution (26° Be) and 106 gm epichlorohydrin was placed in a flask and stirred. The exotherm was controlled to below 60° C. with a cooling water bath. After the exotherm ceased, the batch was kept at 56° C. to 57° C. for about 30 minutes. During that time, the batch turned clear. Then 178 gm of the polyalkyleneamine-amide from Example 1 and 80 gm epichlorohydrin were added into the batch. The batch was then kept at 50° C. to 55° C. and the reaction was allowed to proceed.

A little amount (about 0.25% by weight of the total batch) of 50% caustic soda solution was added in the beginning to keep the pH of the batch at about 7.0. Temperature and solids content was manipulated to give a reasonable reaction rate throughout the reaction. Polymerization was allowed to take place until the batch had a viscosity measurement of 250 cps to 300 cps at 40° C. and 30% solid content. Water was added to stop the reaction. The pH was adjusted to 3.5 with sulfuric acid. The resin had the following properties:

| Solids Content | 15.7% |
|---|---|
| Brookfield Viscosity (LVF #2 spindle at 60 rpm at 25° C.) | 93 cps |
| pH at 25° C. | 3.5 |
| S.G. at 25° C. | 1.062 |

EXAMPLE 3

Wet Strength Performance of the Resin of the Invention Compared to Conventional, Commercially Available Epoxidized Polyalkyleneamine-amide Resins This Example describes the wet strength performance of the resin of this invention as made in Example 2 as compared with conventional, commercially available epoxidized polyalkyleneamine-amide wet strength resin. It was found that the wet strength resin of the invention was comparable in wet strength performance to commercially available resin.

To illustrate the usefulness of the resin derived from the process of this invention, the resin from Example 2 was tested according to the following standard procedure.

A 60/40 blend of bleached softwood kraft and bleached hardwood kraft pulp at 1.6% consistency was beaten to a Canadian Standard Freeness of about 450 ml. This slurry was then diluted to a consistency of 0.25%. The pH was adjusted to 7.0 with sulfuric acid and the resulting pulp slurry was used as a stock for resin addition. 10 ml. of a 0.25% concentration solution of the resin was added to a one liter aliquot of the stock slurry. This is equivalent to the addition of 1.0% resin solids based on the bone dry pulp. Different resin levels can be obtained by the addition of different volumes of this 0.25% resin solution. The resintreated slurry was agitated for 5 minutes and then emptied into a Williams handsheet mold where it was diluted with make-up water to 12 liters. The make-up water was derived from water with its pH adjusted to 7.0. The wet handsheets were pressed between blotters using a Williams Hydraulic Press. The handsheets were then dried in an Emerson Dryer at 230° F. (110° C.) to a moisture content of 5% to 6%. The resulting handsheets were then cured in a Blue "M" Force Air Oven for 10 minutes at 105° C. The cured handsheets were conditioned at 72° F. (23° C.) and 50% relative humidity overnight before testing.

Wet and dry tensile strength were determined using a Thwing-Albert Electro-hydraulic tensile tester with strength measured in pounds per 15 mm width. The wet tensile strength was determined immediately after wetting the specimen with 1 lpm Triton X-100 solution (a commercially available wetting agent identified by the manufacturer as Octyl Phenoxy Polyethoxy Ethanol). Typical test results are summarized in Table I. At least 15 specimens were used for each resin under each test condition. The results represent the average of these observed values for the specimens.

Table 1 records the tensile strength of papers made with varying amounts of prior art resins and the resin of this invention.

TABLE I

| | Tensile Strength of Resin-Treated Paper | | |
|---|---|---|---|
| | (lb/15 mm width) | | Wet Strength |
| Resin | Wet | Dry | (%) |
| At 0.25% Resin Level | | | |
| Cascamid C20* | 2.58 ± 0.10 | 16.7 ± 0.7 | 15.5 |
| Kymene 557H** | 2.57 ± 0.09 | 15.7 ± 0.9 | 16.4 |
| Example 2 (resin of this invention) | 2.45 ± 0.05 | 15.0 ± 0.2 | 16.3 |
| At 0.5% Resin Level | | | |
| Cascamid C20* | 4.60 ± 0.05 | 18.0 ± 1.3 | 25.6 |
| Kymene 557H** | 4.25 ± 0.15 | 17.8 ± 1.3 | 23.9 |
| Example 2 | 4.08 ± 0.06 | 16.9 ± 0.5 | 24.1 |

TABLE I-continued

| | Tensile Strength of Resin-Treated Paper | | |
| | (1b/15 mm width) | | Wet Strength |
| Resin | Wet | Dry | (%) |
| --- | --- | --- | --- |
| (resin of this invention) At 1.0% Resin Level | | | |
| Cascamid C20* | 5.34 ± 0.09 | 19.2 ± 1.5 | 27.8 |
| Kymene 557H** | 5.17 ± 0.22 | 19.5 ± 0.2 | 26.5 |
| Example 2 (resin of this invention) At 1.5% Resin Level | 5.30 ± 0.06 | 19.0 ± 0.5 | 27.9 |
| Cascamid C20* | 5.96 ± 0.20 | 19.2 ± 0.6 | 31.0 |
| Kymene 557H** | 5.61 ± 0.15 | 17.5 ± 1.1 | 32.1 |
| Example 2 (resin of this invention) | 5.98 ± 0.21 | 17.4 ± 0.6 | 34.4 |

*Cascamid C20 Commercial resin made by Borden Chemicals, believed to be made by the procedure described in Chan, U.S. Pat. No. 3,887,510.
**Kymene 557H Commercial resin made by Hercules Company, believed to be made by procedure described to Keim, U.S. Pat. No. 2,926,116.

The data in Table 1 shows that when the same amount by weight of wet strength resin is used, the papers made from each of the three wet strength resins have about the same wet strength.

EXAMPLE 4

Repulpability

This Example illustrates the superior repulpability property of the wet strength resin of this invention over the conventional commercially available epoxidized polyalkyleneamine-amide wet strength resin under the same repulping conditions.

In this experiment, the repulping characteristics of paper were evaluated by measurement of Canadian Standard Freeness. The procedure used is described in The Proceeding of Papermakers Conference, 1974, (organized by Technical Association of Pulp and Paper Industry, U.S.A.).

The CSF (Canadian Standard of Freeness) measurement method is based on the theory that if different resin-treated paper samples are subjected to the same repulping conditions, the paper treated with the more repulpable resin should give a pulp with a higher degree in defiberation or stated another way should give a finer pulp. In other words, the papers treated with the more repulpable resin should have a lower CSF measurement than the paper treated with a resin that is more difficult to repulp.

The repulping procedure is as follows:

Handsheets for repulping were made according to the method described in Example 3. Only handsheets of similar wet tensile or wet strength were used in the repulping test.

2.5 gm of the handsheets treated with the particular resin were weighed. The handsheets were ripped into small pieces (about 5×1.5 cm strips) and placed in a Waring Blendor. Tap water with its pH adjusted to a desired value, of either pH 7 or pH 10 depending on the test being conducted, and heated to 55° C., was added to the blender. A total of 200 ml tap water was added.

The blending was started immediately after the addition of the warm water with an initial 10 seconds on 'low' speed, and then a switch to 'high' speed for 10 minutes total blending.

The blending was stopped after 10 minutes and the temperature of the blended pulp was measured. It was about 60° C. This indicates that the whole blending process was carried out at 55° C. to 60° C. temperature.

The pulp was diluted to 1000 ml with tap water. The temperature of this pulp slurry was then measured and the standard CSF test was made and the measurement was corrected to 0.3% consistency at 20° C.

The lower the CSF reading for a given resin-treated paper the easier to repulp the paper when compared to different resintreated paper using the same test conditions.

Two repulping tests at differing repulping conditions were carried out and the results are summarized in Tables 2a and 2b as follows. The CSF measurement results of this Example were confirmed later using the Standard TAPPI method as described in Example 5, below.

TABLE 2a

Repulpability of Paper Treated with Prior Art Wet Strength Resin; Paper Treated With the Resin of this Invention; and Paper Not Treated With a Commercially Available Wet Strength Resin Repulped at pH7

| Resin | Wet Tensile (1b/15 mm width) | Wet Strength (%) | Average CSF Measured (ml) |
| --- | --- | --- | --- |
| Cascamid C20* | 6.07 ± 0.25 | 33.2 | 366 |
| Resin of This Invention e.g. Example 2 | 6.11 ± 0.06 | 30.9 | 302 |
| Control (no resin added) | 0.82 ± 0.06 | 5.5 | 170 |

*Cascamid C20 - Commercial polyamide wet strength resin made by Borden Chemicals.

TABLE 2b

Repulpability of Paper Treated with Prior Art Wet Strength Resin and Paper Treated with Resin of this Invention Repulped at pH 10

| Resin | Calcium Hypochlorite* added (%) | Average CSF Measured (ml) |
| --- | --- | --- |
| Cascamid C20 | — | 321 |
| Resin of This Invention | — | 280 |
| Cascamid C20 | 0.5 | 211 |
| Resin of This Invention | 0.5 | 161 |
| Cascamid C20 | 1.0 | 157 |
| Resin of This Invention | 1.0 | 123 |

*The calcium hypochlorite is added to the blender after the addition of the paper samples and the necessary amount of water and immediately prior to blending.

In Table 2a, three different papers were repulped at pH7. Two of the papers contained a wet strength resin. These two papers had about the same wet strength. However, when these papers were repulped, the paper with the resin of this invention had a significantly lower CSF measurement than the paper made with the prior art resin. This indicates that paper made with the resin of this invention can be repulped more easily than the paper made with the prior art resin. The third paper tested contained no wet strength resin. This paper had an extremely low CSF measurement which is consistent with fact that the untreated paper had a very low wet strength and repulped very easily.

In Table 2b, the repulpability at pH10 of the two papers of Table 2a which contained a wet strength resin, are compared. In the first case, no calcium hypochlorite was used when repulping; in the second case 0.5% hypochlorite was added; and in the third case 1% hypochlorite was added. Under all three sets of conditions, the paper made with the resin of this invention tion was easier to repulp. Results are summarized in Table 3 below.

TABLE 3

| | Repulpability of Papers Made in a Commercial Paper Mill | | | | | |
|---|---|---|---|---|---|---|
| | | | Wet Tear (2) | | | |
| | Basis | Wet | (MN) | | Degree of | CSF |
| Resin (5) | Wt. (gm/m²) | Mullen (1) (psi) | Cross Direction | Machine Direction | Defiberation (3) (%) | Measured (4) (ml) |
| Commercially Available Polyamide Resin, Cascamid C-20 | 256.3 | 45.9 ± 3.7 | 152 ± 10 | 121 ± 8 | 20-25 | 747 |
| Resin of the Invention | 272.1 | 43.5 ± 2.7 | 150 ± 8 | 117 ± 9 | 50-60 | 717 |

Notes:
(1) 8 × 8 inch square sheet soaked in 1 ppm Triton X-100 solution for 24 hours before test, an average of 9 tests.
(2) Strips of 76 mm × 63 mm cut and soaked in water for 1 hour before test, using the L & W Tear Tester, model Elmendorf. Average of 9 tests.
(3) Estimated by visual observation of handsheets made after treatment of paper in TAPPI Standard Disintegrator at 3000 rpm for 25 minutes.
(4) Measured after TAPPI Standard Disintegrator treatment.
(5) Other ingredients added to the paper included: Alum: 30 lb/ton = 1.5% of dry paper weight Rosin Size: 12.5 lb/ton = 0.625% of dry paper weight.

had a significantly lower CSF measurement than the paper made with the prior art resin. This indicates that the paper made with the resin of this invention can be repulped more easily.

EXAMPLE 5

Repulping Properties

This Example demonstrates that resin made according to the instant invention is superior in repulping properties to conventional epoxidized polyalkyleneamine-amide resin when tested by the TAPPI Standard Disintegrator method.

The TAPPI Standard Disintegrator Method (T205 M-58) is described as follows:

24 gm of resin-treated paper were torn into pieces by hand to approximately one-half inch square. Cutting the sample must be avoided as this can affect the physical properties of the paper significantly.

The paper was placed in the container of the Standard Disintegrator. 2000 ml of distilled water at 20° C., adjusted to pH, 10 was added.

The Disintegrator was set at 3000 rpm for 75000 revolutions, i.e., for 25 minutes.

After completion of the treatment, the slurry was removed from the container. A 250 ml aliquot of the slurry was removed and diluted to 1 litre for CSF test. The diluted slurry was measured for temperature and then used to make a handsheet. Measurements were made and used to confirm the CSF tests in Example 4.

The rest of the slurry was diluted (85 ml diluted to 1 liter) to make handsheets in the standard sheet machine. These handsheets were made to show the degree of defiberation that took place in the standard Disintegrator for 25 minutes. The higher the degree of defiberation the easier the resin-treated paper was to repulp.

Resin samples were sent to a commercial paper mill for a plant trial. Paper treated with the resin of this invention and paper treated with the conventional commercial available polyalkyleneamine-amide wet strength resins were made on the pilot machine in the mill. Paper samples were obtained from this mill and brought back to the laboratory for evaluation using the TAPPI Standard Disintegrator Method. Tests showed that the paper treated with the resin of the instant inven- The data in Table 3 shows that a prior art resin-treated paper had about the same or slightly higher wet strength than the paper made with the resin of this invention. The data also shows that when the papers were repulped, the degree of defiberation of the paper of this invention was more than twice the degree of defiberation of the prior art resin-treated paper. The paper of this invention also had a CSF reading that was significantly lower than the CSF reading of the prior art resin-treated paper. The data therefore confirms that the paper of this invention is more easily repulped than a prior art resin-treated paper with the same wet strength.

Examples 6 to 8, below, demonstrate that the resin prepared according to the preferred method of the instant invention has superior wet strength and repulpability performance when tested against the resin comparable to that disclosed in Babcock, U.S. Pat. No. 3,224,990.

EXAMPLE 6

Preparation of Wet Strength Resin According to the Babcock Patent U.S. Pat. No. 3,224,990 Assigned to Pacific Resins and Chemicals, Inc.

This Example describes the preparation of a wet strength resin according to the Babcock patent, U.S. Pat. No. 3,224,990, which will be referred to as the Babcock patent.

The wet strength resin was made using the same ingredients (i.e., epichlorohydrin; ammonia; and the polyalkyleneamine-amide); the same molar ratio of the ingredients (i.e., 2.5:0.5:1.0); and the same procedures as described in Example 2 of the Babcock patent except that the polyalkyleneamine-amide used was the preferred polyalkyleneamine-amide of this invention i.e., the reaction product of dimethylglutarate and diethylenetriamine, whereas Babcock used the reaction product of adipic acid and diethylenetriamine.

437.5 gm water and 145.7 gm polyalkyleneamine-amide (from Example 1) were put in a flask. This was followed by the addition of 12.5 gm of a 28% ammonium hydroxide solution and 95.4 gm epichlorohydrin.

When the exothermic reaction was complete, the batch was heated to 70° C. and maintained at 70° C. The viscosity was monitored using the Gardner scale. 25% sodium hydroxide solution was added to the batch to maintain the viscosity advancement until the final viscosity as indicated in the Babcock patent was obtained. At that time, 90% formic acid was added to adjust the pH to 3.6. Details of the procedure are described in Example 2 of the Babcock patent.

The final product made according to the Babcock patent except for the polyalkyleneamine-amide used had the following properties:

| | |
|---|---|
| Solid Content | 26.14% |
| pH at 25° C. | 3.6 |
| Gardner Viscosity | C |
| Brookfield Viscosity (LVF2/60/25° C.) | 68 cps |
| S.G. at 25° C. | 1.090 |

This resin will be referred to as the Babcock-like resin.

EXAMPLE 7

Evaluation of Wet Strength Performance: Resin of this Invention Against the Babcock-Like Resin of Example 6 above This Example demonstrates the superior wet strength performance of the resin of the instant invention over the wet strength performance of the Babcock-like resin.

In this Example, the wet strength resin of the instant invention (Example 2) was tested against the Babcock-like wet strength resin (Example 6) in two types of furnishes: bleached pulp furnish and unbleached pulp furnish. In both tests, the resin of our Example 2 provided the better wet strength performance under all of the several different testing conditions. The results are summarized in Table 4a and in Table 4b as follows:

TABLE 4a

Strength of Paper made from Bleached Pulp

| Resin | Cure Time (Minutes) | Tensile (lb/15 mm width) Wet | Dry | Wet Strength (%) |
|---|---|---|---|---|
| At 1.0% Resin Level | | | | |
| Example 2 | 4 | 4.87 ± 0.17 | 19.2 ± 0.6 | 25.3 |
| (Resin of | 5 | 5.15 ± 0.10 | 19.3 ± 0.5 | 26.7 |
| Instant | 10 | 5.19 ± 0.10 | 18.9 ± 1.2 | 27.5 |
| Invention) | 15 | 5.76 ± 0.13 | 19.8 ± 0.6 | 29.1 |
| | 30 | 6.32 ± 0.06 | 19.9 ± 1.0 | 31.8 |
| Example 6 | 4 | 4.20 ± 0.02 | 17.8 ± 0.4 | 23.6 |
| (above | 5 | 4.42 ± 0.10 | 18.1 ± 0.5 | 24.4 |
| Babcock-like | 10 | 4.75 ± 0.18 | 18.8 ± 0.7 | 26.6 |
| resin, U.S. Pat. | 15 | 5.18 ± 0.18 | 18.0 ± 0.2 | 28.8 |
| No. 3,224,990) | 30 | 5.24 ± 0.08 | 19.7 ± 0.3 | 26.6 |

TABLE 4b

Strength of Paper made from Unbleached Pulp

| Resin | Resin Level (%) | Tensile Strength (lb/15 mm width) Wet* | Dry | Wet Strength (%) |
|---|---|---|---|---|
| Example 2 | 0.6 | 4.99 ± 0.11 | 14.7 ± 0.9 | 33.9 |
| Example 6 | 0.6 | 4.63 ± 0.25 | 13.8 ± 1.3 | 33.6 |
| Example 2 | 0.7 | 5.74 ± 0.06 | 16.1 ± 0.4 | 35.7 |
| Example 6 | 0.7 | 4.67 ± 0.19 | 15.6 ± 0.3 | 29.9 |

*Wet Tensile - Soaked in 1 ppm Triton X-100 solution for 10 minutes prior to test.

EXAMPLE 8

Evaluation of Repulpability using CSF Method Instant Invention vs. Resin of U.S. Pat. No. 3,224,990: the Babcock Patent This Example demonstrates that when resin-treated paper samples having the same degree of wet strength are tested for repulpability using the CSF measurement method, the paper samples treated with the resin of the instant invention are easier to repulp than those treated with the Babcock Resin.

In order to obtain paper samples of the same degree of wet strength, paper samples treated with higher resin level of the Babcock patent were evaluated against paper samples treated with a lower resin level of the resin of the instant invention. These paper samples were repulped under conditions of pH 7 and pH 10 using the CSF method. It was found that under both pH test conditions, paper samples treated with the resin of the instant invention were easier to repulp than paper samples treated with the Babcock Resin. The results are summarized in Table 5 as follows:

TABLE 5

| Resin | Wet Tensile (lb/15 mm width) | Wet Strength (%) | CSF measured* (ml) Test in pH 7 | Test in pH 10 |
|---|---|---|---|---|
| Example 2 (Resin of Instant Invention) | 6.11 ± 0.0_ | 30.9 | 302 | 280 |
| Example 6 (Babcock Resin U.S. Pat. No. 3,224,990) | 6.00 ± 0.22 | 30.0 | 236 | 303 |

*The pH of the water was adjusted to 7 or 10 as required before blending takes place.

CONCLUSION

The following U.S. patents, referred to in this application, are incorporated herein by reference:

| | |
|---|---|
| Keim | 2,926,154 |
| | 3,125,552 |
| Chan | 3,887,510 |

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A cationic resin that is the reaction product of
   (a) an epoxidized ammonia that is the reaction product of ammonia and an epihalohydrin;
   (b) a polyalkyleneamine-amide, and
   (c) an epihalohydrin, said polyalkyleneamine-amide being a polymer containing a structural unit which has at least one secondary amine group between two amide groups.

2. The resin of claim 1 wherein said epoxidized ammonia reaction product (a) is the reaction product of said epihalohydrin and ammonia in the proportions of from 1 to 2 moles of epihalohydrin with from 0.8 to 1.1 moles of ammonia.

3. The resin of claim 2 wherein said epihalohydrin is epichlorohydrin.

4. The resin of claim 3 wherein said epoxidized ammonia reaction product (a) is the reaction product of about 2 moles of epichlorohydrin with about 1 mole of ammonia.

5. The resin of claim 1 wherein said polyalkyleneamine-amide is the reaction product of a polyalkylene polyamine and a diester of an aliphatic polycarboxylic acid.

6. The resin of claim 2 wherein said polyalkyleneamine-amide is the reaction product of a polyalkylene polyamine and a diester of an aliphatic dicarboxylic acid.

7. The resin of claim 6 wherein said carboxylic acid is saturated.

8. The resin of claim 6 wherein said carboxylic acid is unsaturated.

9. The resin of claim 6 wherein said diester is a di(-lower alkyl) diester.

10. The resin of claim 9 wherein said polyalkylene polyamine is diethylenetriamine and said diester is dimethyl glutarate.

11. The resin of claim 3 wherein the molar ratio of total epichlorohydrin to ammonia to polyalkyleneamine-amide is from 2 to 3.7 moles of epichlorohydrin to 0.8 to 1 moles of ammonia for each mole of polyalkyleneamine-amide.

12. The resin of claim 11 wherein said molar ratio is about 3.5 total moles of epichlorohydrin to about 1 mole of ammonia for each mole of polyalkyleneamine-amide.

13. The resin of claim 11 wherein said polyalkyleneamine-amide is the reaction product of a polyalkylene polyamine and a diester of an aliphatic polycarboxylic acid.

14. The resin of claim 13 wherein said diester is a di(lower alkyl) diester of a dicarboxylic acid.

15. The resin of claim 14 wherein said polyalkyleneamine is diethylene triamine and said diester is dimethyl glutarate.

16. A cationic resin that is the reaction product of
(a) an epoxidized ammonia that is the reaction product of from 1 to 2 moles of epihalohydrin with from 0.8 to 1.1 moles of ammonia;
(b) a polyalkyleneamine-amide that is the reaction product of a polyalkylene polyamine and a diester of an aliphatic dicarboxylic acid, and
(c) an epihalohydrin,
said polyalkyleneamine-amide being a polymer containing a structural unit which has at least one secondary amine group between two amide groups.

17. The resin of claim 16 wherein the molar ratios of total epihalohydrin to ammonia to polyalkyleneamine-amide is from 2 to 3.7 moles of epihalohydrin total to 0.8 to 1 mole of ammonia for each mole of polyalkyleneamine-amide.

18. The resin of claim 17 wherein said polyalkylene polyamine is a di(lower alkylene) triamine and said diester is a di(lower alkyl) ester of an aliphatic dicarboxylic acid.

19. The resin of claim 18 wherein said polyalkylene polyamine is diethylene triamine and said diester is a di(lower alkyl) adipate.

20. The resin of claim 18 wherein said polyalkylene polyamine is diethylene triamine and said diester is dimethyl glutarate.

21. The resin of claim 17 wherein said epihalohydrin is epichlorohydrin.

22. The resin of claim 18 wherein said epihalohydrin is epichlorohydrin.

23. An aqueous solution of a thermosetting cationic resin that is the reaction product of:
(a) an epoxidized ammonia that is the reaction product of ammonia and an epihalohydrin in an aqueous solution;
(b) a polyalkyleneamine-amide, and
(c) an epihalohydrin,
said polyalkyleneamine-amide being a polymer containing a structural unit which has at least one secondary amine group between two amide groups.

24. The resin solution of claim 23 wherein said epoxidized ammonia reaction product (a) is the reaction product of said epihalohydrin and ammonia in the proportions of from 1 to 2 moles of epihalohydrin with from 0.8 to 1.1 moles of ammonia.

25. The resin solution of claim 24 wherein said polyalkyleneamine-amine is the reaction product of a polyalkylene polyamine and diester of an aliphatic polycarboxylic acid.

26. The resin solution of claim 25 wherein the molar ratio of total epihalohydrin to ammonia to polyalkyleneamine-amide is from 2 to 3.7 moles of epihalohydrin to 0.8 to 1 mole of ammonia for each mole of polyalkyleneamine-amide.

27. The resin solution of claim 26 wherein said epihalohydrin is epichlorohydrin.

28. The resin solution of claim 27 wherein said diester is a di(lower alkyl) ester of an aliphatic dicarboxylic acid.

29. The resin solution of claim 28 wherein said diester is dimethyl adipate.

30. The resin solution of claim 28 wherein said polyalkyleneamine is diethylene triamine and said diester is dimethyl glutarate.

31. The resin solution of claim 26 that is characterized by having a pH at 25° C. of about 3.5.

32. The resin solution of claim 31 that is characterized by a Brookfield viscosity of 40 cps to 80 cps as measured on a Brookfield LVF viscometer using a #2 spindle at 60 rpm at 25° C. at a resin solids concentration of 12%.

33. A wet strength paper comprising paper having as a wet strength additive thereto the resin of claim 1.

34. A wet strength paper comprising as a wet strength additive thereto the resin of claim 13.

35. A wet strength paper comprising as a wet strength additive thereto the resin of claim 18.

36. A process for making a cationic resin comprising reacting together:
(a) an epoxidized ammonia;
(b) a polyalkyleneamine-amide; and
(C) an epihalohydrin,
said polyalkyleneamine-amide being a polymer containing a structural unit which has at least one secondary amine group between two amide groups.

37. The process of claim 36 wherein said epoxidized ammonia reaction product (a) is the reaction product of from 1 to 2 moles of epihalohydrin with from 0.8 to 1.1 moles of ammonia.

38. The process of claim 37 wherein the molar ratio of total epihalohydrin to ammonia to polyalkyleneamine-amide is from 2 to 3.7 moles of epihalohydrin to 0.8 to 1 mole of ammonia for each mole of polyalkyleneamine-amide.

39. The process of claim 38 wherein said epihalohydrin is epichlorohydrin.

40. The process of claim 39 wherein said reaction is carried out in an aqueous solution at a temperature not above 60° C.

41. The process of claim 40 wherein said polyalkyleneamine-amide is the reaction product of a polyalkylene polyamine and a diester of an aliphatic dicarboxylic acid.

42. The process of claim 41 wherein said carboxylic acid is a saturated acid.

43. The process of claim 41 wherein said carboxylic acid is an unsaturated acid.

44. The process of claim 41 wherein said polyalkylene polyamine is diethylene triamine and said diester is dimethyl glutarate.

45. The process of claim 41 wherein said polyalkylene polyamine is diethylene triamine and said diester is dimethyl adipate.

46. The process of claim 41 further comprising cooling the reaction mixture during the reaction to maintain a temperature of from about 56° C. to about 57° C. until said reaction mixture clears.

47. A process for making a wet strength paper comprising incorporating therein as a wet strength additive a cationic resin that is the reaction product of
   (a) an epoxidized ammonia that is the reaction product of ammonia and an epihalohydrin;
   (b) a polyalkyleneamine-amide, and
   (c) an epihalohydrin,
said polyalkyleneamine-amide being a polymer containing a structural unit which has at least one secondary amine group between two amide groups.

48. A process for making a wet strength paper comprising incorporating therein as a wet strength additive a cationic resin that is the reaction product of
   (a) an epoxidized ammonia that is the reaction product of from 1 to 2 moles of epihalohydrin with from 0.8 to 1.1 moles of ammonia, or equivalent proportions thereof,
   (b) a polyalkyleneamine-amide, and
   (c) an epihalohydrin,
wherein said polyalkyleneamine-amide is the reaction product of a polyalkylene polyamine and a di(lower alkyl) ester of an aliphatic dicarboxylic acid.

49. The process of claim 48 wherein the molar ratio of total epihalohydrin to ammonia to polyalkyleneamine-amide in said cationic resin is from 2 to 3.7 moles of epihalohydrin to 0.8 to 1 mole of ammonia for each mole of polyalkyleneamine-amide.

50. The process of claim 49 wherein said polyalkylene polyamine is diethylene triamine and said diester is dimethyl glutarate.

51. The process of claim 49 wherein said epihalohydrin is epichlorohydrin.

52. A process for preparing an aqueous solution of a cationic thermosetting epoxidized polyalkyleneamine-amide resin which comprises
   reacting (a) aqueous epoxidized ammonia, said epoxidized ammonia being the epoxidized ammonia reaction product of ammonia with epichlorohydrin; (b) polyalkyleneamine-amide; and (c) additional epichlorohydrin;
   wherein said molar ratio of said epichlorohydrin to said ammonia in said epoxidized ammonia is about 2:1; and
   wherein water is added to said epichlorohydrin-ammonia reaction at the beginning of said reaction to adjust the concentration by weight of said epichlorohydrin plus said ammonia to about 30% of the combined weight of said added water and said epichlorohydrin plus said ammonia; and
   wherein said epichlorohydrin-ammonia reaction is allowed to proceed at 56° C. to 57° C. until the mixture of said epichlorohydrin and ammonia in water clears;
   wherein said polyalkyleneamine-amide is made by the reaction of a di(lower alkyl) ester of a dicarboxylic acid and diethylenetriamine;
   wherein the molar ratio of the total amount of epichlorohydrin to said ammonia to said polyalkyleneamine-amide is about 3.5:1:1; and
   wherein at beginning of said reaction of (a), (b), and (c), sodium hydroxide is added to raise the pH to at least 7.

* * * * *